Sept. 12, 1933. J. N. NELSON 1,926,731
OPHTHALMIC MOUNTING
Filed Nov. 6, 1930
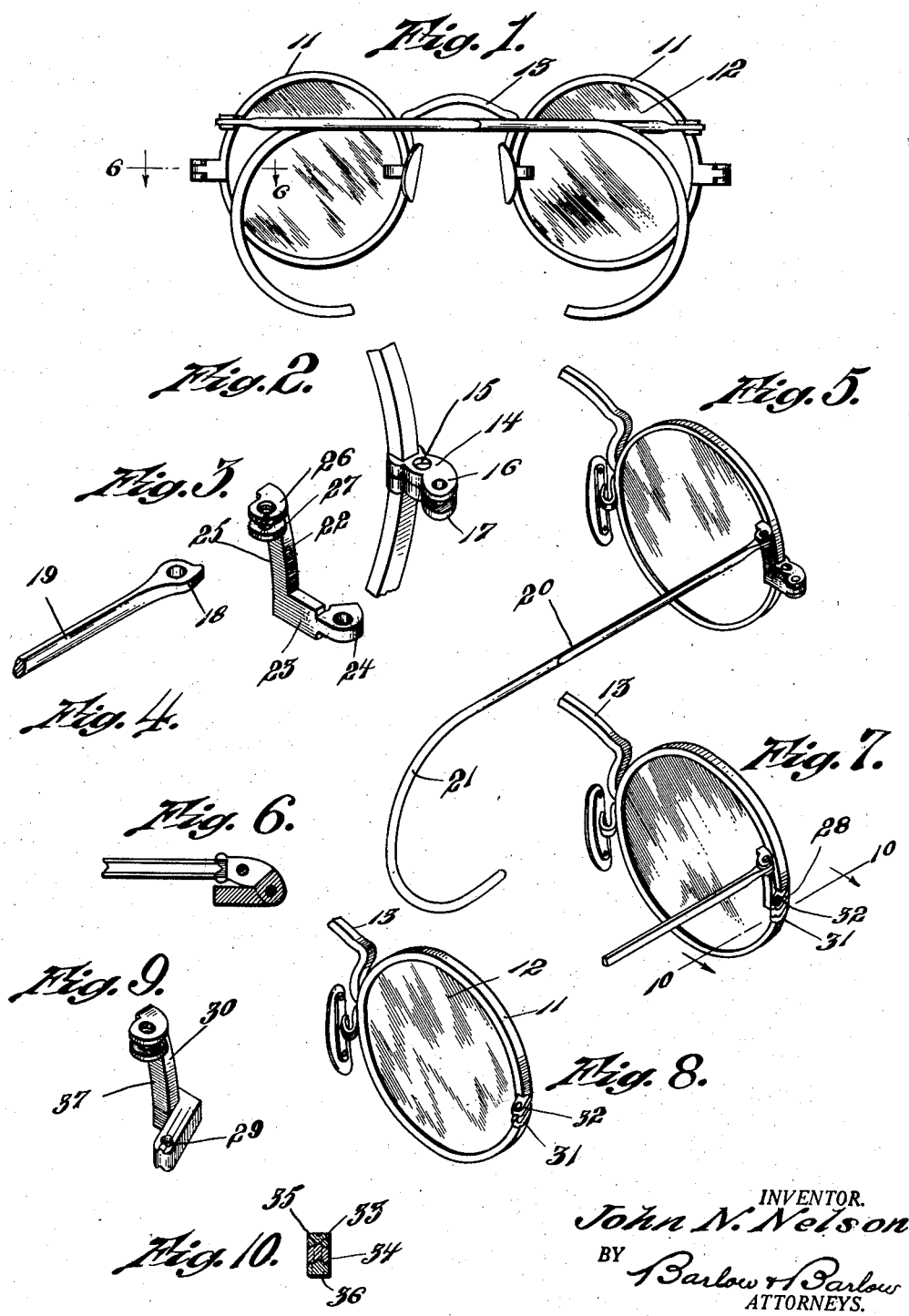
INVENTOR.
John N. Nelson
BY Barlow & Barlow
ATTORNEYS.

Patented Sept. 12, 1933

1,926,731

UNITED STATES PATENT OFFICE 1,926,731

OPHTHALMIC MOUNTING

John N. Nelson, Providence, R. I., assignor to Universal Optical Corporation, a corporation of Rhode Island Application November 6, 1930. Serial No. 493,780

10 Claims. (Cl. 88—53)

This invention relates to an ophthalmic mounting, and has for its object to provide a member which will convert the common spectacle frame, which has end pieces and temples located in a plane at substantially the middle portion thereof, into a construction whereby the temples are raised above the middle portion of the frame to permit clear side vision and prevent the temples from obstructing vision of the wearer to the side.

A further object of this invention is to convert the common spectacle frame into a clear vision frame by providing an attachment to be inserted between the temple and end piece for raising the temple above the middle of the frame and with no other change necessary in the frame.

A still further object of this invention is to provid a member for converting the mounting into one in which the temples do not obstruct the side view which will be hidden from view from the front of the mounting.

With these and other objects and advantageous features in view, the invention consists of a novel arrangement of parts more fully disclosed in the detailed description following, in conjunction with the accompanying drawing, and more particularly set forth in the appended claims.

In the drawing:

Fig. 1 is a rear view of the spectacle frame with the temples in folded position and illustrating the auxiliary members as positioned between the end pieces and the temples;

Fig. 2 is a perspective view of a portion of the lens rim and end piece;

Fig. 3 is a perspective view of the auxiliary attachment member;

Fig. 4 is a perspective view of a portion or end of the temple;

Fig. 5 is a perspective view of one of the lens rims and a portion of the bridge and showing the auxiliary member as connecting the end piece and temple;

Fig. 6 is a section on line 6—6 of Figure 1;

Fig. 7 is a perspective view of a modified form of mounting showing the fastening for securing the end pieces together as also serving to mount and secure the auxiliary member in position;

Fig. 8 is a perspective view similar to Figure 7 showing the member as removed therefrom;

Fig. 9 is a perspective view of the auxiliary attachment member itself;

Fig. 10 is a section on line 10—10 of Figure 7, illustrating the centering rib and groove for holding the member in desired aligning position.

In the use of spectacle frames for mounting lenses, it is usual to laterally extend the end pieces from the lens rims at a point substantially at the middle of the rims or in line with the center of the lenses, and when worn, the temples so located obstruct the vision of the wearer to the side to a certain extent to avoid which it has been found desirable to raise the temple to a point above obstructing position; and in order that the frames which are now in use with the lateral end pieces at the middle portion thereof and the temples used therewith may be adapted to this new and more desirable type, I have provided a member which may be inserted between the end piece and the temple to raise the position of the temple, and by the insertion of this member, the frame as a whole is adapted to perform this improved function of permitting unobstructed lateral vision; and the following is a detailed description of the present embodiment of this invention, illustrating the preferred means by which these advantageous results may be accomplished.

With reference to the drawing, 11 designates the rims of the lenses 12 which are joined together by a bridge 13. End pieces 14 extend laterally outwardly from the rims, and the parts of the end pieces for each rim are secured together by suitable securing means such as a screw 15 and provide ears 16 and 17 at their outer ends spaced apart to receive in usual use the ear 18 of the temple 19, which temple has a shank portion 20 and head engaging portion 21 to extend over the ear of the wearer and hold the frames in place.

The present invention relates particularly to the member 22 which is positioned between the end piece and the temple to rearrange the frame and raise the temple to obtain the improved desired result above mentioned. The member 22 is generally L-shaped with one leg 23 of the L provided with an ear 24 to fit between the ears 17 and 18 of the end piece and be securely held therein. The leg 23 of the member 22 will be positioned in substantially the plane of the end piece while the leg 25 will extend vertically from the leg 23 at right angles thereto, although following the curvature of the rim 11 as illustrated in Figure 1 to lie back of the same to be hidden from view from the front of the mounting. At the upper end of the leg 25, ears 26 and 27 are provided to receive the ear 18 on the temple and hingedly mount the same in position, thus the temple will be raised in its horizontal plane when in position on the wearer by insertion of the member 22 to an extent substantially the vertical dimension of the leg 25 of the member 22, thus permitting unobstructed side vision of the wearer of the frames.

In some instances, instead of providing a separate binder for the parts of the end piece as 15, I may provide a single threaded pin 28 and so form the rims 11 and end pieces that the portion 29 of a somewhat modified adapter member 30 may be positioned between the portions 31 and 32 of the end piece and be bound in position by the pin 28, in which case the rib 33 will be raised upon the leg 29 with a corresponding groove 34 on its opposite side to fit in groove 35 and receive the rib 36 in the portions 32 and 31, respectively, of the end piece, thus preventing swinging of the adapter member about the single pin 28 for securing it in position. The upwardly extending leg 37 of this modified adapter member will be the same as the corresponding part of the member 22 above described.

I also find it of advantage to position the portions of the end piece in this modified form to extend rearwardly at an angle of substantially 45° to the plane of the rims to provide a more compact relation and better to hide the vertically extending portion of the adapter member from view.

While I have described certain construction forms which embody the principles of my invention, it is obvious that other desired changes in arrangement may be made within the spirit and the scope of the invention as defined in the appended claims.

I claim:

1. In an ophthalmic mounting, a pair of lens rims each having an end piece extending laterally therefrom, a temple for each end piece, and a separate L-shaped member positioned between each end piece and temple and connected to the end piece and temple to locate the temple and end piece in different generally horizontal planes when in position on the wearer.

2. In an ophthalmic mounting, a pair of lens rims each having an end piece extending laterally therefrom, a temple for each end piece, and a separate L-shaped member positioned between each end piece and temple and connected to the end piece and temple with one leg extending upwardly to elevate the temple a substantial distance above the end piece to prevent side obstruction of vision of said temple.

3. In an ophthalmic mounting, a pair of lens rims each having an end piece extending laterally therefrom, a temple for each end piece, a separate L-shaped member positioned between each end piece and temple and connected to the end piece and temple with one leg extending upwardly to elevate the temple a substantial distance above the end piece to prevent side obstruction of vision of said temple, said upwardly extending portion being located rearwardly from the lens rim to be hidden from view from the front thereof.

4. In an ophthalmic mounting, a pair of lens rims each having a laterally extending end piece with spaced ears, a temple for each end piece having a straight shank portion with a head engaging portion at one end to extend over the ear of the wearer and a hinge ear at the opposite end located generally in the plane of the straight shank portion, and adapted to fit between said spaced ears, and an auxiliary generally L-shaped member having an ear at the end of one of the legs clamped between said pair of ears and the other leg extending upwardly and having a pair of ears at the end thereof hingedly mounting said temple eye, whereby said temple is in a raised plane from said end piece to prevent obstruction of side vision of the wearer.

5. In an ophthalmic mounting, a pair of lens rims each having an end piece laterally extending therefrom, a temple for each end piece, and a separate member having upwardly offset portions extending from a horizontal and positioned between each end piece and temple and connected to the end piece and temple to locate the temple and end piece in different generally horizontal planes when in position on the wearer.

6. An ophthalmic mounting, a pair of lens rims each having an end piece extending laterally therefrom, a temple for each end piece, and a separate member having upwardly offset portions extending from a horizontal and positioned between each end piece and temple and connected to the end piece and temple to elevate the temple a substantial distance above the end piece to prevent side obstruction of vision by said temple.

7. In an ophthalmic mounting, a pair of lens rims each having an end piece extending laterally therefrom, a temple for each end piece, a separate member having upwardly offset portions extending from a horizontal and having a portion in the plane of said end piece and secured thereto and having another portion extending at an angle thereto to which the temple is connected to offset the temple from the plane of said end piece and a temple hinged to said angularly extending portion.

8. In an ophthalmic mounting, a pair of lens rims each having an end piece extending laterally therefrom, a temple for each end piece, a separate member having upwardly offset portions extending from a horizontal and having a portion in the plane of said end piece and secured thereto and having another portion extending upwardly at an angle thereto to which the temple is connected to elevate the temple from the plane of said end piece, and a temple hinged to said angularly extending portion.

9. In an ophthalmic mounting, a pair of lens rims each having an end piece extending laterally therefrom, a temple for each end piece, and a separate member having upwardly offset portions extending from a horizontal and positioned between each end piece and temple and connected to the end piece and temple to locate the temple and end piece in different generally horizontal planes when in position on the wearer, each member having a portion extending along the lens rim back of the same to be hidden from view from the face thereof.

10. In an ophthalmic mounting, a pair of lens rims, each having an end piece extending laterally therefrom at an angle to the plane of said rims, a temple for each end piece, and a separate member having upwardly offset portions extending from a horizontal and positioned between each end piece and temple and connected to the end piece and temple to locate the temple and end piece in different generally horizontal planes when in position on the wearer.

JOHN N. NELSON.